Figure 1:
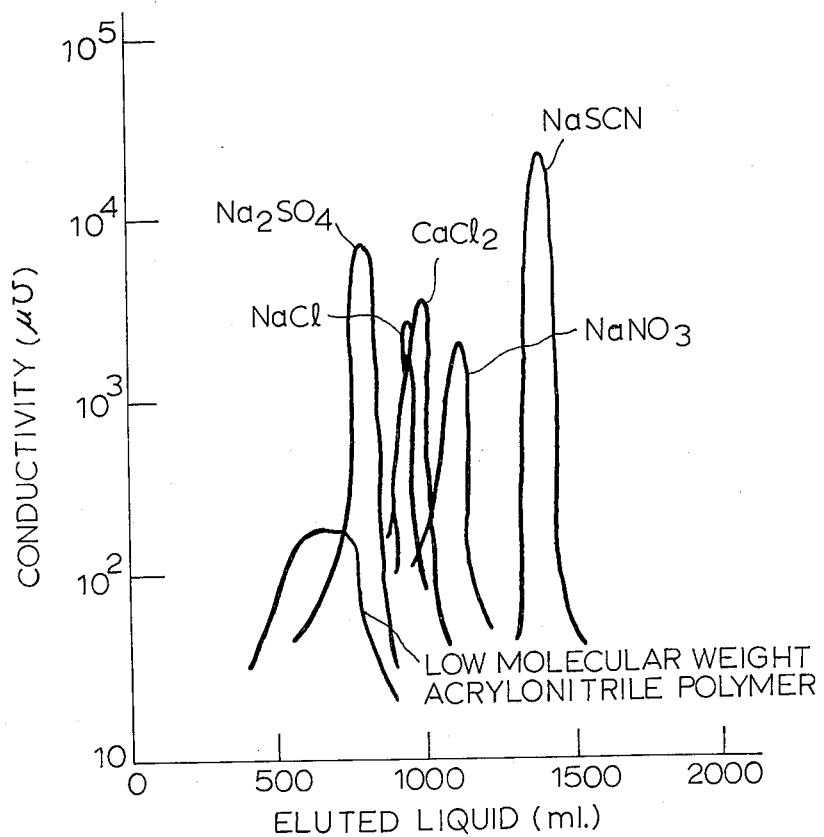

United States Patent [19]

Shimosaka et al.

[11] 3,887,688

[45] June 3, 1975

[54] PROCESS FOR REFINING AQUEOUS SOLUTION OF THIOCYANATE CONTAINING IMPURITIES

[75] Inventors: Yukio Shimosaka; Masahiko Ozaki; Jiro Negi, all of Okayama, Japan

[73] Assignee: Japan Exlan Company Limited, Osaka, Japan

[22] Filed: Jan. 31, 1974

[21] Appl. No.: 438,350

[30] Foreign Application Priority Data
Feb. 15, 1973  Japan ................................ 48-18619

[52] U.S. Cl. ............................................... 423/366
[51] Int. Cl. .............................................. C01c 3/20
[58] Field of Search ....................... 423/366; 210/24

[56] References Cited
UNITED STATES PATENTS
2,871,093  1/1959  Blanchard ........................ 423/366 X FOREIGN PATENTS OR APPLICATIONS
243,727  5/1960  Australia
592,767  9/1947  United Kingdom
1,032,629  6/1966  United Kingdom
199,123  1/1967  U.S.S.R.

Primary Examiner—L. Dewayne Rutledge
Assistant Examiner—Arthur J. Steiner
Attorney, Agent, or Firm—Wenderoth, Lind & Ponack

[57] ABSTRACT

Process for refining an aqueous solution of a thiocyanate containing impurities which involves (a) feeding an aqueous solution of a thiocyanate containing impurities to a cross-linked dextran layer so that the impurities and thiocyanate may be caught in said cross-linked dextran layer, (b) passing an eluent through said cross-linked dextran layer so that the impurities flow away together with the eluent, and (c) then further passing an eluent through the cross-linked dextran layer to recover the effluent containing the thiocyanate.

7 Claims, 4 Drawing Figures

PROCESS FOR REFINING AQUEOUS SOLUTION OF THIOCYANATE CONTAINING IMPURITIES

This invention relates to a process for refining an aqueous solution of a thiocyanate containing impurities and more particularly to a process for refining an aqueous solution of a thiocyanate containing impurities which comprises feeding an aqueous solution of a thiocyanate containing impurities to a cross-linked dextran layer so that the impurities and thiocyanate are caught in said cross-linked dextran layer, then passing an eluent in an amount necessary to flow away the impurities ththrough said cross-linked dextran layer so that the impurities are flowed away together with the eluent and then further passing an eluent to recover the effluent containing the thiocyanate.

Generally a large amount of inorganic and organic impurities such as inorganic salt, organic compound and polymer is contained in an aqueous solution of a thiocyanate produced, recovered or by-produced in the synthesis of a thiocyanate, production of acrylic synthetic fibers or treatment of waste gases so as to be harmless so that, in order to obtain a pure thiocyanate from such impure aqueous solution of the thiocyanate, it has been necessary to apply a proper refining operation to said aqueous solution of the thiocyanate.

However, since a thiocyanate is an inorganic salt, usual refining method with distilling operation as in the purification of organic compounds can not be applied but such complicated refining method as by an absorption-filtration, precipitation-filtration or recrystallization is exclusively adopted. Thus it is known to refine a thiocyanate solution by absorption-filtration method with the use of active carbon (U.S. Pat. No. 2,871,093) but ion-dissociable impurities can not be removed. In the method by precipitation-filtration utilizing a solubility difference, only impurities low in the solubility can be removed. Further, in the method by recrystallization, the removal of impurities is imperfect and a large amount of the thiocyanate remains in the mother liquor and the recovery rate is so low that the method is not practical.

We have found the facts that, in a method by a gel filtration using a cross-linked dextran substance having a molecular sieve effect, a thiocyanate shows a behavior peculiar as compared with that of any other inorganic salt, and have found that when such method is applied to the purification of an aqueous solution of a thiocyanate containing organic or inorganic impurities, the organic or inorganic compounds coexisting in said aqueous solution as impurities can be effectively separated or removed.

Thus a principal object of the present invention is to provide an excellent process for refining an aqueous solution of a thiocyanate containing impurities.

Another object of the present invention is to provide a process whereby impurities can be easily and perfectly separated and removed from an aqueous solution of a thiocyanate containing the impurities without resorting to such operation as distillation.

Still another object of the present invention is to efficiently refine a thiocyanate by inhibiting as much as possible various secondary reactions in the refining operation and preventing the decomposition and modification of the thiocyanate.

Other objects of the present invention will become clear from the following description which will be made by referring partly to the accompanying drawings wherein FIGS. 1, 2, 3 and 4 show elution curves obtained by the use of various columus charged with cross-linked dextran substances of Examples 1, 2, 3 and 4 respectively.

The above mentioned objects of the present invention are attained by feeding an aqueous solution of a thiocyanate containing impurities to a cross-linked dextran layer so that the impurities and thiocyanate and caught in said cross-linked dextran layer, then passing an eluent in an amount necessary to flow away the impurities through said cross-linked dextran layer so that the impurities are flowed away together with the eluent and then further passing an eluent so that the effluent eluent containing the thiocyanate are separated.

For example, when an aqueous solution of a thiocyanate containing such impurities as an acrylonitrile polymer (molecular weight of 1,000 to 100,000), sodium sulfite, sodium sulfate, sodium chloride and sodium nitrate is fed to a cross-linked dextran layer so that the impurities and thiocyanate are caught in such cross-linked layer and then an eluent is passed through said cross-linked layer, the acrylonitrile polymer, sodium sulfite or sodium sulfate, sodium chloride, sodium nitrate and thiocyanate will be eluted in the order mentioned. Therefore, when the impurities such as the acrylonitrile polymer and the others are first flowed away together with the eluent and then the effluent eluent containing the thiocyanate is separated and taken, the aqueous solution of the thiocyanate will be able to be refined easily and efficiently.

It is clear that such peculiar phenomenon that the thiocyanate elutes at last can not be explained with only the size of the solute molecule in the light of the fact that sodium chloride elutes earlier though the hydrated ion radius (3.32 A) of the chlorine ion is smaller than the hydrated ion radius (3.35 A) of the nitric acid ion. The effect in the present invention is presumed to be due to the special adsorbing phenomenon of the cross-linked dextran substance.

In carrying out the method of the present invention, (1) generally an elution curve of a column charged with a cross-linked dextran substance is determined in advance and then the effluent is separated on the basis of the predetermined elution curve or (2) the solute in the eluent flowing out of the column is successively analyzed by a proper analyzing method and the eluent containing the objective solute is directly separated. As a means of analyzing the concentration of each component in the eluent, a nondestractive analysis such as analyses by the ultraviolet ray absorption strength, measurements of distillation residue weight, hydrogen ion concentration or degree of coloring may be employed, and the electric conductivity measurement is most preferable for the analysis of the ionic component.

In the method of the present invention, the amount of the eluent necessary to flow away the impurities caught in the column depends on the amount of the cross-linked dextran substance contained in the column, the amount of the aqueous solution of the thiocyanate containing impurities and the kinds of the impurities. However, anyhow, in each particular case, the amount may be determined by a proper analyzing means.

Further, the amount of feed of an aqueous solution of a thiocyanate containing impurities is less than about 1/5 or preferably less than 1/10 the volume of the cross-linked dextran substance contained in the column.

The cross-linked dextran substances to be used in this invention are reaction products of a hydroxyl group-containing dextran substance with a bifunctional aliphatic compound containing from 1 to 10 carbon atoms the chain of carbon atoms of which may be interrupted by ether groups and containing halogen atoms and/or epoxy groups at the end of the chain, for example

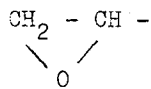

which react with the hydroxyl groups of the dextran with formation of linkages of ether type, so that a polymerization product containing at least two of the molecules of the dextran substance bound together with ether bridges is obtained.

The term "dextran substances" used in the present specification and in the appended claims is intended to comprise dextran as well as hydrophilic hydroxyl group-containing derivatives of dextran. For example, as dextran substances in the reaction may be used native dextran or partially depolymerized dextran orneutral hydroxyl group-containing hydrophilic derivatives of dextran or partially depolymerized dextran, such as ethyl-, hydroxyethyl or 2-hydroxy-propylether of dextran or dextran glycerine glycoside, or hydrodextran (i.e., dextran, the reducing end groups of which have been reduced to alcohol groups), or hydroxyl group-containing hydrophilic derivatives of dextran or partially depolymerized dextran containing acid or basic groups, for example, carboxyl groups, sulphonic acid groups, or amino groups or substituted amino groups, such as carboxymethyldextran or dextran, the end groups of which are oxidized to carboxyl groups. Often also fractions of the above-mentioned dextran substances may advantageously be used.

As examples of suitable fibunctional substances may in the first place be mentioned bifunctional glycerine derivatives, such as epichlorohydrin, dichlorohydrin, epibromohydrin and dibromohydrin, further 1,2-3,4-diepoxybutane, bis-epoxypropyl ether, ethylene glycol-bis-epoxy propyl ether, 1,4-butane-diol-bis-epoxy-propyl ether, propyleneglycol, polyethylene glycols and similar compounds.

As concrete examples of such cross-linked dextran substances, there can be enumerated Sephadex LH-20, G-10, G-15, G-25, etc. (produced by Pharmacia Fine Chemical Co.).

For the aqueous solution of the thiocynate which can be refined according to the present invention, there can be enumerated aqueous solutions of such inorganic thiocyanates as sodium thiocyanate, potassium thiocyanate, calcium thiocyanate and ammonium thiocyanate. Generally an aqueous solution having a concentration of 0.01 to 60 % or particularly 0.1 to 50 % of thiocyanate is preferable.

For the eluent to be used in the present invention, there can be enumerated water, dimethyl formamide, ethanol, etc.

The process of the present invention may be applied extensively to the refinement of an aqueous solution of a thiocyanate containing impurities as produced, recovered or by-produced in the synthesis of a thiocyanate, process for producing acrylic synthetic fibers or process for treating waste gases so as to be harmless, and is effective particularly to the refinement of an aqueous solution of a thiocyanate recovered in the process for producing acrylic synthetic fibers. As is known, a concentrated aqueous solution of thiocyanate used as a solvent in the production of acrylic synthetic fibers is generally recovered from the coagulating bath. In such liquor there are contained such impurities as inorganic salt, organic sulfonate and low molecular weight polymer in addition to the thiocyanate, and these impurities cause various troubles such as the reduction of the solubility of the polymer, clogging of the filter, clogging of the nozzle, break of the fibers and deterioration of the fiber quality. However, by applying the refining operation according to the present invention, such impurities can be removed and thus the above described troubles can be eliminated.

Further, in industrially working the method of the present invention, it is necessary to consider also the economy. Therefore, practical operating conditions are set by making it a point to reduce the amount of the thiocyanate mixed into the eluent containing impurities to be flowed away rather than to prevent the impurities from mixing into the eluent containing the thiocyanate.

The invention will be further explained by means of the following examples wherein the parts and percentages are all by weight unless otherwise specified.

EXAMPLE 1

A cross-linked dextran: Sephadex LH-20 (produced by Pharmacia Fine Chemical Co.) swollen with water was filled in a column of an inside deameter of 50 mm. and length of 1 m. and the void volume of gel particles was made about 500 ml. Then 50 ml. of an aqueous solution of a low molecular weight acrylonitrile polymer (molecular weight less than 10,000) of a concentration of 0.1 % was fed from the top of the column so that the low molecular weight acrylonitrile polymer is caught in Sephadex LH-20. Then pure water as an eluent was passed at a flow rate of 2 ml./min. and the electric conductivity and capacity of the eluted liquid were measured to prepare the elution curve shown in FIG. 1. Further, with an aqueous solution of each of sodium sulfate, sodium chloride, calcium chloride, sodium nitrate and sodium thiocyanate of a concentration of 0.1 %, the elution curve shown in FIG. 1 was also prepared in the same manner. It is clear from FIG. 1 that, in order to flow away various impurities contained in 50 ml. of the aqueous solution of the thiocyanate containing such various impurities as the low molecular weight acrylonitrile polymer, 1,300 ml. of pure water was required.

On the basis of the thus obtained curves, 50 ml. of an aqueous solution of sodium thiocyanate of a concentration of 50 % containing a low molecular weight acrylonitrile polymer, sodium sulfate, sodium chloride, calcium chloride and sodium nitrate as impurities were fed to the above mentioned column to catch the impurities and sodium thiocyanate, then 1,300 ml. of pure water was passed at a flow rate of 2 ml./min. through the column to flow away all the impurities, then further pure water was passed at the same flow rate and the eluted liquid containing sodium thiocyanate was separated as an aqueous solution of sodium thiocyanate containing no impurity.

EXAMPLE 2

Figure 2:
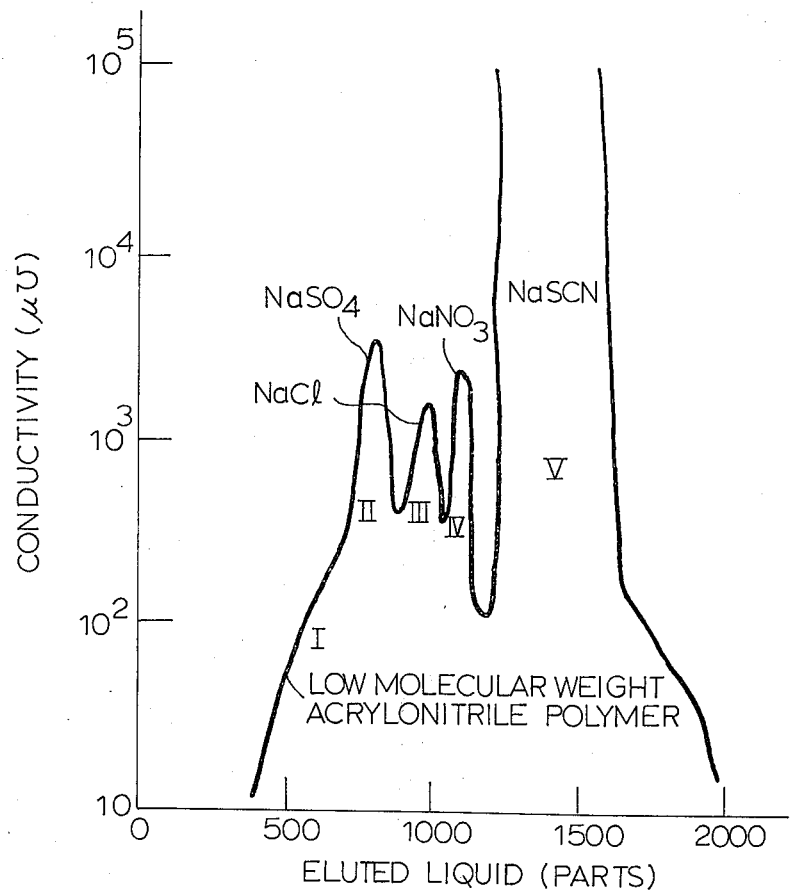
Figure 3:
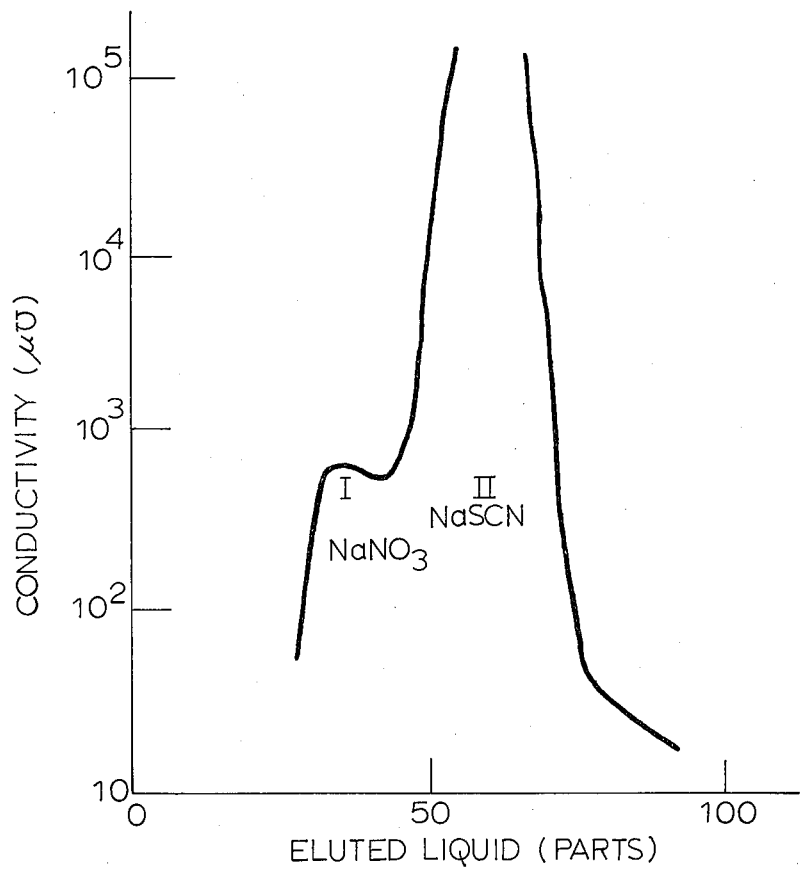
Figure 4:
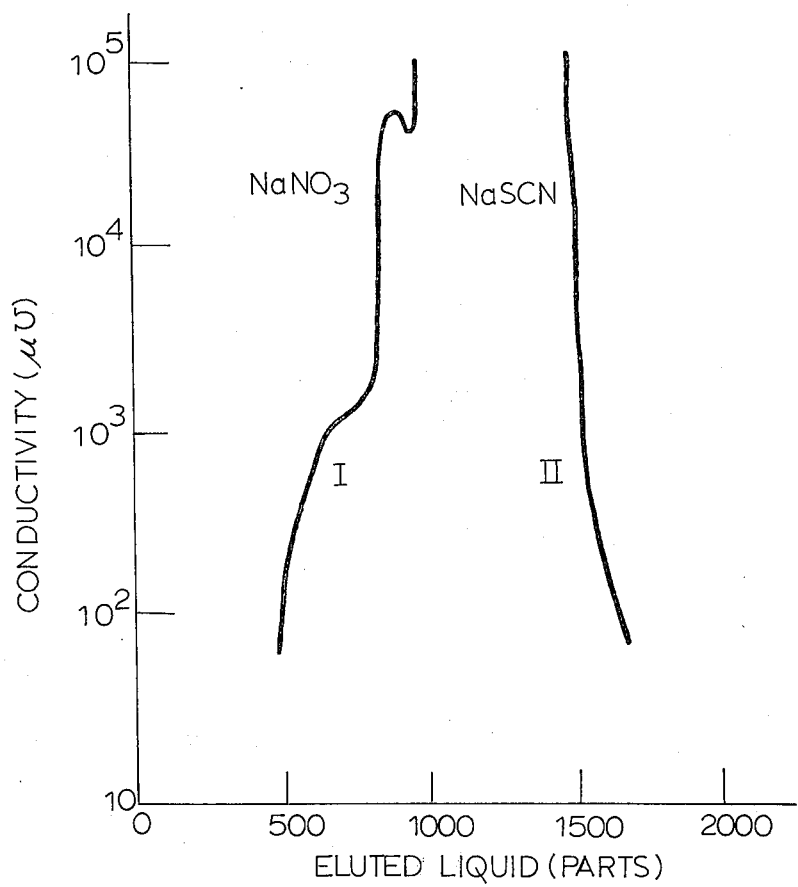

50 parts of an aqueous solution of sodium thiocyanate of a concentration of 50 % containing a low molecular weight acrylonitrile polymer (molecuar weight less than 10,000) having sulfonic groups at the terminal, sodium sulfate, sodium chloride and sodium nitrate were fed into the same column as in Example 1 so that the impurities and sodium thiocyanate are caught in the cross-linked dextran substance, then pure water was passed at a flow rate of 2 ml./min. and the electric conductivity and capacity of of the eluted liquid were measured to prepare the elution curve shown in FIG. 2. It is clear from FIG. 2 that, by passing about 1300 parts of pure water as an eluent, the impurities contained in 50 parts of the above mentioned aqueous solution of sodium thiocyanate can be flowed away.

On the basis of such curve, 50 parts of the above mentioned aqueous solution of sodium thiocyanate were fed into the above mentioned column so that the impurities and sodium thiocyanate are caught in the cross-linked dextran body, then 1,300 parts of pure water were passed at a flow rate of 2 ml./min. so that all the impurities are flowed away, further pure water was passed at the same flow rate and the eluted liquid was separated and recovered to obtain a pure aqueous solution of sodium thiocyanate.

EXAMPLE 3

A cross-linked dextran substance: Sephadex G-10 (produced by Pharmacia Fine Chemical Co.) swollen with water was filled in a column of a inside diameter of 13 mm. and length of 70 cm. and the void volume of gel particles was made about 35 ml. Then 5 parts of an aqueous solution of sodium thiocyanate of a concentration of 60 % containing 1.2 % sodium nitrate were fed from the top of the column and the elution curve shown in FIG. 3 was prepared in the same manner as in Example 2 except that the flow rate was made 3.5 ml./min. It is clear from FIG. 3 that, in order to flow away sodium nitrate contained in 5 parts of the above mentioned sodium thiocyanate, about 50 parts of pure water (eluent) are required.

On the basis of such curve, a pure aqueous solution of sodium thiocyanate containing no sodium sulfate was obtained in the same manner as in Example 2.

EXAMPLE 4

A cross-linked dextran substance: Sephadex LH-20 (produced by Pharmacia Fine Chemical Co.) swollen with water was filled in a column of an inside diameter of 50 mm. and length of 1 m. and the void volume of gel particles was made about 325 ml. Then 150 parts of an aqueous solution of sodium thiocyanate of a concentration of 60 % containing 1.28 % sodium nitrate were fed into the column and the elution curve shown in FIG. 4 was prepared in the same manner as in Example 2 except that the flow rate was made 0.8 ml./min. It is clear from this curve that, in order to flow away sodium nitrate contained in 150 parts of said aqueous solution of sodium thiocyanate, about 1,000 parts of pure water are required.

On the basis of the thus prepared curve, a pure aqueous solution of sodium thiocyanate containing no sodium nitrate was obtained in the same manner as in Example 2.

What is claimed is:

1. A process for refining an aqueous solution of a thiocyanate containing impurities which comprises (a) feeding an aqueous solution of a thiocyanate containing impurities to a cross-linked dextran layer so that the impurities and thiocyanate may be caught in said cross-linked dextran layer, (b) then passing an eluent in an amount necessary to flow away the impurities through said cross-linked dextran layer so that the impurities may be flowed away together with the eluent, and (c) then further passing an eluent through said cross-linked dextran layer so that the effluent eluent containing the thiocyanate may be separated.

2. The process for refining an aqueous solution of a thiocyanate containing impurities as in claim 1 wherein a concentration of a thiocyanate in an aqueous solution to be refined is 0.01 % by weight to 60 % by weight.

3. The process for refining an aqueous solution of a thiocyanate containing impurities as in claim 2 wherein a concentration of a thiocyanate in an aqueous solution to be refined is 0.1 % by weight to 50 % by weight.

4. The process for refining an aqueous solution of a thiocyanate containing impurities as in claim 1 wherein the thiocyanate is sodium thiocyanate.

5. The process for refining an aqueous solution of a thiocyanate containing impurities as in claim 1 wherein the eluent is a water.

6. The process for refining an aqueous solution of a thiocyanate containing impurities as in claim 1 wherein the aqueous solution to be refined is an aqueous solution of a thiocyanate recovered in the process for producing acrylic synthetic fibers.

7. The process for refining an aqueous solution of a thiocyanate containing impurities as in claim 1 wherein a feed ratio of an aqueous solution of a thiocyanate containing impurities is less than about 1/5 the volume of the cross-linked dextran substance contained in the column.

* * * * *